(12) United States Patent
Wu et al.

(10) Patent No.: US 11,116,009 B2
(45) Date of Patent: Sep. 7, 2021

(54) SYNCHRONOUS CLEAR TO SEND SIGNALING

(71) Applicant: QUALCOMM Incorporated, San Diego, CA (US)

(72) Inventors: Zhibin Wu, Bedminster, NJ (US); Sudhir Kumar Baghel, Hillsborough, NJ (US); Shailesh Patil, San Diego, CA (US); Kapil Gulati, Dover, DE (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/032,449

(22) Filed: Jul. 11, 2018

(65) Prior Publication Data

US 2019/0044779 A1    Feb. 7, 2019

Related U.S. Application Data

(60) Provisional application No. 62/540,989, filed on Aug. 3, 2017.

(51) Int. Cl.
*H04W 74/08* (2009.01)
*H04W 4/40* (2018.01)
(Continued)

(52) U.S. Cl.
CPC ......... *H04W 74/0816* (2013.01); *H04W 4/40* (2018.02); *H04W 84/12* (2013.01); *H04W 88/06* (2013.01)

(58) Field of Classification Search
CPC . H04W 74/0816; H04W 4/40; H04W 56/001; H04W 72/1215; H04W 84/12
See application file for complete search history.

(56) References Cited

U.S. PATENT DOCUMENTS

| 2005/0208956 A1* | 9/2005 | Takagi | H04W 74/0816 455/464 |
| 2007/0133457 A1* | 6/2007 | Doi | H04W 74/0816 370/329 |

(Continued)

FOREIGN PATENT DOCUMENTS

EP    2757850 A1    7/2014

OTHER PUBLICATIONS

International Search Report and Written Opinion—PCT/US2018/041778—ISA/EPO—dated Sep. 21, 2018.

*Primary Examiner* — Samina F Choudhry
(74) *Attorney, Agent, or Firm* — Holland & Hart LLP

(57) ABSTRACT

Methods, systems, and devices for wireless communication are described. In some wireless communications systems, some user equipment (UEs) may be configured for sidelink communications using a first radio access technology (RAT) (e.g., via a cellular network) and other wireless devices may be configured for sidelink communications using a second RAT (e.g., via a wireless local area network (WLAN)). In order to mitigate interference between communications using the first and second RAT, when a first UE is scheduled to transmit or receive a data transmission on a set of resources using the first RAT, the first UE may transmit a message using the second RAT indicating that the data transmission is to occur on the set of resources. Accordingly, the second device may receive the message and determine to refrain from communicating on the set of resources.

28 Claims, 13 Drawing Sheets

(51) Int. Cl.
*H04W 84/12* (2009.01)
*H04W 88/06* (2009.01)

(56) References Cited

U.S. PATENT DOCUMENTS

| | | | |
|---|---|---|---|
| 2010/0161834 A1* | 6/2010 | Newald | G06F 13/28 710/8 |
| 2011/0313770 A1* | 12/2011 | Pottle | G08B 5/226 704/258 |
| 2012/0140743 A1* | 6/2012 | Pelletier | H04W 76/28 370/335 |
| 2012/0207101 A1* | 8/2012 | Chang | H04W 74/0825 370/329 |
| 2013/0208587 A1* | 8/2013 | Bala | H04W 16/14 370/230 |
| 2014/0341129 A1* | 11/2014 | Zhu | H04W 28/0289 370/329 |
| 2014/0376922 A1* | 12/2014 | Oshima | H04B 10/541 398/118 |
| 2015/0095493 A1* | 4/2015 | Xu | H04B 3/542 709/225 |
| 2015/0110054 A1* | 4/2015 | Dinan | H04W 72/12 370/329 |
| 2015/0215100 A1 | 7/2015 | Jeon et al. | |
| 2016/0021679 A1* | 1/2016 | Jose | H04W 72/1278 370/329 |
| 2016/0050634 A1* | 2/2016 | Seok | H04W 52/146 370/338 |
| 2016/0150536 A1 | 5/2016 | Valliappan et al. | |
| 2016/0309469 A1* | 10/2016 | Shu | H04L 1/18 |
| 2017/0094677 A1* | 3/2017 | Liu | H04W 72/0446 |
| 2017/0245245 A1* | 8/2017 | Kim | H04W 72/1284 |

\* cited by examiner

SYNCHRONOUS CLEAR TO SEND SIGNALING

CROSS REFERENCES

The present Application for patent claims the benefit of U.S. Provisional Patent Application No. 62/540,989 by WU, et al., entitled "SYNCHRONOUS CLEAR TO SEND SIGNALING," filed Aug. 3, 2017, assigned to the assignee hereof, and expressly incorporated by reference herein.

INTRODUCTION

The following relates generally to wireless communication and more specifically to synchronous clear to send (CTS) signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communications systems may support sidelink communications between UEs. In some examples, different groups of UEs may communicate using different radio access technologies (RATs) over a shared wireless spectrum. For example, a first UE may communicate with another UE over a shared wireless spectrum using a first RAT (e.g., a wireless local area network (WLAN) such as wireless fidelity (Wi-Fi)), and a second UE may communicate with another UE over the shared wireless spectrum using a second RAT (e.g., a cellular network). In some cases, however, both UEs may be scheduled to communicate on the same resources over the shared wireless spectrum, and transmissions to or from the UEs may interfere, resulting in reduced throughput in a wireless communications system.

SUMMARY

A method of wireless communication is described. The method may include identifying a wireless channel allocated for a data transmission using a first RAT during a first time period, transmitting a message using a second RAT indicating that the data transmission is to occur during the first time period, the second RAT being a WLAN and being different from the first RAT, the message being transmitted during a second time period designated for second RAT transmissions by one or more UEs, and transmitting or receiving the data transmission over the wireless channel during the first time period.

An apparatus for wireless communication is described. The apparatus may include means for identifying a wireless channel allocated for a data transmission using a first RAT during a first time period, means for transmitting a message using a second RAT indicating that the data transmission is to occur during the first time period, the second RAT being a WLAN and being different from the first RAT, the message being transmitted during a second time period designated for second RAT transmissions by one or more UEs, and means for transmitting or receiving the data transmission over the wireless channel during the first time period.

Another apparatus for wireless communication is described. The apparatus may include a processor, memory in electronic communication with the processor, and instructions stored in the memory. The instructions may be operable to cause the processor to identify a wireless channel allocated for a data transmission using a first RAT during a first time period, transmit a message using a second RAT indicating that the data transmission is to occur during the first time period, the second RAT being a WLAN and being different from the first RAT, the message being transmitted during a second time period designated for second RAT transmissions by one or more UEs, and transmit or receiving the data transmission over the wireless channel during the first time period.

A non-transitory computer readable medium for wireless communication is described. The non-transitory computer-readable medium may include instructions operable to cause a processor to identify a wireless channel allocated for a data transmission using a first RAT during a first time period, transmit a message using a second RAT indicating that the data transmission is to occur during the first time period, the second RAT being a WLAN and being different from the first RAT, the message being transmitted during a second time period designated for second RAT transmissions by one or more UEs, and transmit or receiving the data transmission over the wireless channel during the first time period.

In some examples of the method, apparatus, and non-transitory computer-readable medium described above, transmitting the message comprises: transmitting a preamble during the second time period, wherein the second time period may be prior to the first time period and the preamble may be transmitted using the second RAT.

In some examples of the method, apparatus, and non-transitory computer-readable medium described above, transmitting the message comprises: transmitting the message across a first band of frequencies that overlaps with and may be wider than a second band of frequencies used for the data transmission.

In some examples of the method, apparatus, and non-transitory computer-readable medium described above, transmitting the message comprises: transmitting multiple messages simultaneously during the second time period using the second RAT across respective first bands of frequencies that overlap with and may be collectively wider than a second band of frequencies used for the data transmission.

In some examples of the method, apparatus, and non-transitory computer-readable medium described above, the message comprises a common broadcast address as a receiver address.

Some examples of the method, apparatus, and non-transitory computer-readable medium described above may further include processes, features, means, or instructions for receiving a configuration parameter indicating whether to transmit the message.

Some examples of the method, apparatus, and non-transitory computer-readable medium described above may further include processes, features, means, or instructions for identifying that the second time period designated for transmitting the message overlaps with the first time period allocated for the data transmission. Some examples of the method, apparatus, and non-transitory computer-readable medium described above may further include processes, features, means, or instructions for determining to postpone transmission of the data transmission until after the second time period designated for transmitting the message based at least in part on the identification.

In some examples of the method, apparatus, and non-transitory computer-readable medium described above, the message indicates a duration of the first time period.

In some examples of the method, apparatus, and non-transitory computer-readable medium described above, the duration of the first time period may be based on an expected duration of the data transmission.

In some examples of the method, apparatus, and non-transitory computer-readable medium described above, the second time period may be synchronized to a global clock.

In some examples of the method, apparatus, and non-transitory computer-readable medium described above, the second time period spans one or more symbols.

In some examples of the method, apparatus, and non-transitory computer-readable medium described above, the message comprises a clear to send (CTS) message.

In some examples of the method, apparatus, and non-transitory computer-readable medium described above, the message comprises a Wi-Fi control packet.

In some examples of the method, apparatus, and non-transitory computer-readable medium described above, the data transmission comprises a vehicle-to-everything (V2X) transmission.

A method of wireless communication is described. The method may include receiving a message indicating that a data transmission is to occur over a wireless channel during a first time period using a first RAT, the message being received using a second RAT that is a WLAN, the first RAT being different from the second RAT, the message being transmitted during a second time period designated for transmissions of messages using the second RAT by one or more UEs and refraining from communicating over the wireless channel during the first time period based at least in part on receiving the message.

An apparatus for wireless communication is described. The apparatus may include means for receiving a message indicating that a data transmission is to occur over a wireless channel during a first time period using a first RAT, the message being received using a second RAT that is a WLAN, the first RAT being different from the second RAT, the message being transmitted during a second time period designated for transmissions of messages using the second RAT by one or more UEs and means for refraining from communicating over the wireless channel during the first time period based at least in part on receiving the message.

Another apparatus for wireless communication is described. The apparatus may include a processor, memory in electronic communication with the processor, and instructions stored in the memory. The instructions may be operable to cause the processor to receive a message indicating that a data transmission is to occur over a wireless channel during a first time period using a first RAT, the message being received using a second RAT that is a WLAN, the first RAT being different from the second RAT, the message being transmitted during a second time period designated for transmissions of messages using the second RAT by one or more UEs and refrain from communicating over the wireless channel during the first time period based at least in part on receiving the message.

A non-transitory computer readable medium for wireless communication is described. The non-transitory computer-readable medium may include instructions operable to cause a processor to receive a message indicating that a data transmission is to occur over a wireless channel during a first time period using a first RAT, the message being received using a second RAT that is a WLAN, the first RAT being different from the second RAT, the message being transmitted during a second time period designated for transmissions of messages using the second RAT by one or more UEs and refrain from communicating over the wireless channel during the first time period based at least in part on receiving the message.

In some examples of the method, apparatus, and non-transitory computer-readable medium described above, receiving the message comprises: receiving the message from multiple UEs as part of a synchronous transmission.

In some examples of the method, apparatus, and non-transitory computer-readable medium described above, receiving the message comprises: receiving a preamble during the second time period and using the second RAT, wherein the second time period may be prior to the first time period.

In some examples of the method, apparatus, and non-transitory computer-readable medium described above, receiving the message comprises: receiving the message across a first band of frequencies that overlaps with and may be wider than a second band of frequencies used for the data transmission.

In some examples of the method, apparatus, and non-transitory computer-readable medium described above, receiving the message comprises: receiving multiple messages simultaneously during the second time period using the second RAT across respective first bands of frequencies that overlap with and may be collectively wider than a second band of frequencies used for the data transmission.

In some examples of the method, apparatus, and non-transitory computer-readable medium described above, the message comprises a common broadcast address as a receiver address.

In some examples of the method, apparatus, and non-transitory computer-readable medium described above, the message indicates a duration of the first time period.

In some examples of the method, apparatus, and non-transitory computer-readable medium described above, the duration of the first time period may be based on an expected duration of the data transmission.

In some examples of the method, apparatus, and non-transitory computer-readable medium described above, the second time period may be synchronized to a global clock.

In some examples of the method, apparatus, and non-transitory computer-readable medium described above, the second time period spans one or more symbols.

In some examples of the method, apparatus, and non-transitory computer-readable medium described above, the message comprises a CTS message.

In some examples of the method, apparatus, and non-transitory computer-readable medium described above, the message comprises a Wi-Fi control packet.

In some examples of the method, apparatus, and non-transitory computer-readable medium described above, the data transmission comprises a V2X transmission.

DETAILED DESCRIPTION

Figure 1:
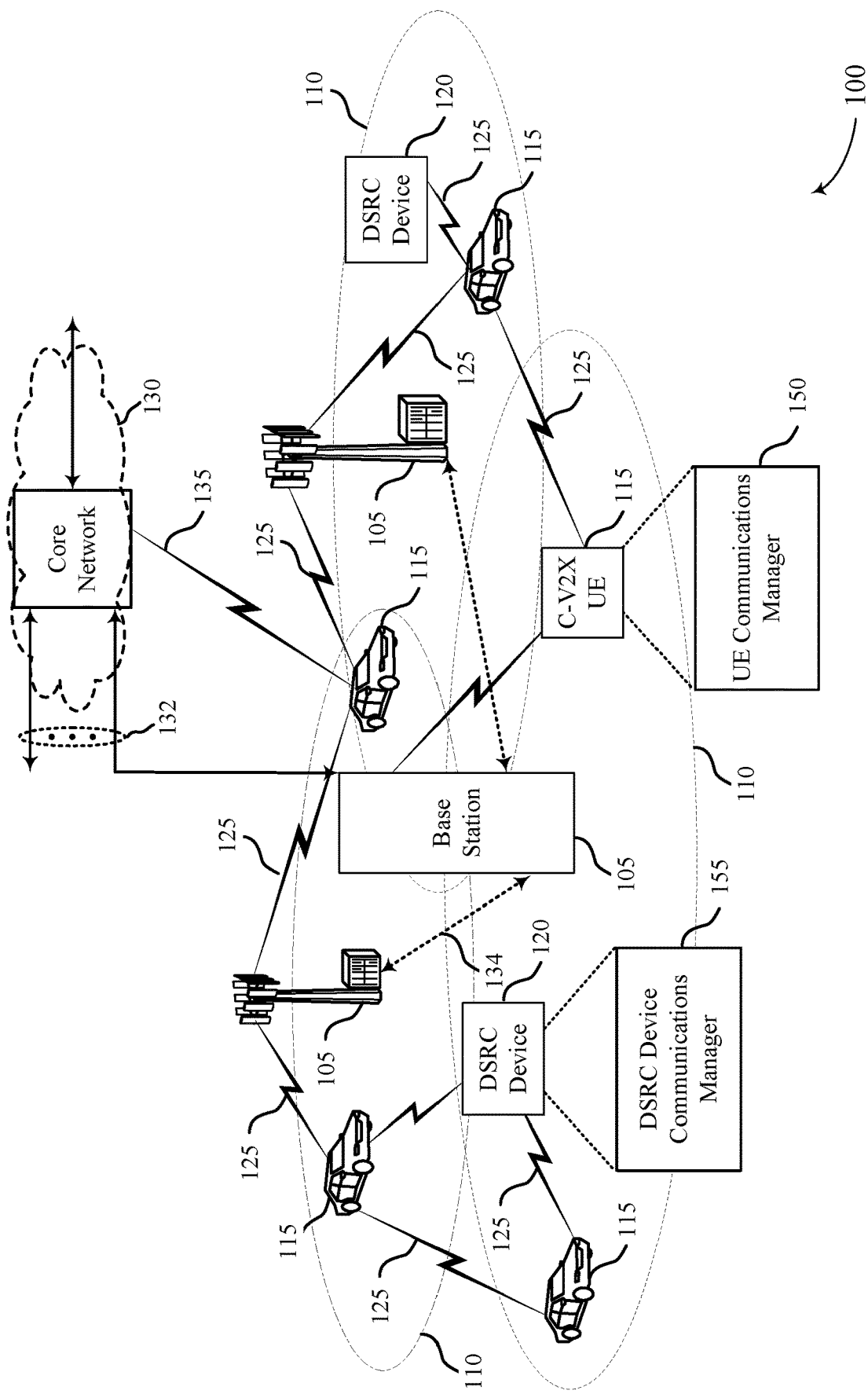
FIGS. 1 and 2 illustrate examples of wireless communications systems that support synchronous CTS signaling in accordance with one or more aspects of the present disclosure.

Some wireless communications systems may support sidelink communication between UEs. Sidelink communication may also be referred to as device-to-device (D2D) communication, peer-to-peer (P2P) communication, vehicle-to-vehicle (V2V) communication, V2X communication, etc. In some aspects (e.g., for V2X communication), a first set of UEs may communicate with each other over sidelink connections using a first RAT and a second set of wireless devices (potentially overlapping with the first set of UEs) may communicate with each other over sidelink connections using a second RAT. In one example, the first set of UEs may support cellular V2X (C-V2X) communications and may communicate with each other via a cellular network, and the second set of wireless devices may support DSRC and may communicate with each other via a WLAN.

In some cases, UEs of the first set may be scheduled for C-V2X communications on a set of resources, and wireless devices of the second set may be scheduled for DSRC on the same set of resources (e.g., over a shared wireless spectrum). In such cases, the DSRC may interfere with the C-V2X communications resulting in reduced throughput in a wireless communications system. In order to mitigate the interference between the C-V2X communications and the DSRC, the wireless device scheduled for DSRC may attempt to detect the energy levels of a channel to determine whether the channel is being used for C-V2X communications prior to communicating on the channel. However, since C-V2X transmissions may typically span a narrow frequency band, it may be difficult for the wireless device scheduled for DSRC to detect the C-V2X transmission, and the C-V2X communications and DSRC may still interfere.

As described herein, a UE may support efficient techniques for mitigating the interference between C-V2X communications and DSRC over a shared wireless spectrum. Specifically, prior to transmitting or receiving a C-V2X data transmission over a wireless channel, a UE may transmit a message via the WLAN (e.g., a CTS message) indicating that the C-V2X data transmission is to occur during one or more subsequent transmission time intervals (TTIs). In some cases, a base station may allocate resources for the UE to use to transmit the message via the WLAN periodically or based on some other predefined schedule. Further, such resources may be used by multiple UEs to transmit similar messages across a wide frequency band such that the transmissions of the messages from the UEs are synchronized (i.e., synchronous transmissions of CTS messages via the WLAN). A wireless device supporting DSRC may receive the one or more messages and determine to refrain from communicating on a wireless channel during the one or more TTIs. Accordingly, interference between C-V2X communications and DSRC may be reduced and throughput may be increased.

Aspects of the disclosure introduced above are described below in the context of a wireless communications system. Examples of processes and signaling exchanges that support synchronous CTS signaling are then described. Aspects of the disclosure are further illustrated by and described with reference to apparatus diagrams, system diagrams, and flowcharts that relate to synchronous CTS signaling.

FIG. 1 illustrates an example of a wireless communications system 100 that supports synchronous CTS signaling in accordance with one or more aspects of the present disclosure. The wireless communications system 100 includes base stations 105 (e.g., gNodeBs (gNBs), and/or radio heads (RHs)), C-V2X-capable UEs (referenced generally herein as UEs 115), DSRC devices 120, and a core network 130. In some examples, the wireless communications system 100 may be an LTE (or LTE-Advanced (LTE-A)) network, or an NR network. In some cases, wireless communications system 100 may support enhanced mobile broadband (eMBB) communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, downlink transmissions from a base station 105 to a UE 115, and sidelink transmissions from a UE 115 to another UE 115 or DSRC device 120. Control information and data may be multiplexed on an uplink channel or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

As used herein, UEs 115 in wireless communications system 100 are C-V2X capable. DSRC devices 120 in wireless communications system 100 may or may not be C-V2X capable, but may instead support DSRC. UEs 115 and DSRC devices 120 may be dispersed throughout the wireless communications system 100, and each UE 115 or DSRC device 120 may be stationary or mobile. A UE 115 or DSRC device 120 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 or DSRC device 120 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, an automobile component, a train, a train component, or the like. A UE 115 or DSRC device 120 may communicate with the core network 130 through communication link 135.

One or more of the UEs 115 may include a UE communications manager 150, which may be an example of the UE communications manager 515, 615, and 715 described with reference to FIGS. 5 through 7. In some cases, UE communications manager 150 may be used to identify a wireless channel allocated for a data transmission using a first RAT during a first time period, transmit a message using a second RAT indicating that the data transmission is to occur during the first time period, the second RAT being a WLAN and being different from the first RAT, the message being transmitted during a second time period designated for second RAT transmissions by one or more UEs 115, and transmit or receive the data transmission over the wireless channel during the first time period.

One or more of the DSRC devices 120 may include a DSRC device communications manager 155, which may be an example of the DSRC device communications manager 815, 915, and 1015 described with reference to FIGS. 8 through 10. In some cases, DSRC device communications manager 155 may be used to receive a message indicating that a data transmission is to occur over a wireless channel during a first time period using a first RAT, the message being received using a second RAT that is a WLAN, the first RAT being different from the second RAT, the message being transmitted during a second time period designated for transmissions of messages using the second RAT by one or more UEs, and refrain from communicating over the wireless channel during the first time period based at least in part on receiving the message.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105 or gNBs 105.

A base station 105 may be connected by an S1 interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the EPC. All user internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base stations 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (ARQ) (HARD) to provide retransmission at the MAC layer to improve link efficiency. In the control plane, the Radio Resource Control (RRC) protocol layer may provide establishment, configuration, and maintenance of an RRC connection between a UE 115 and a base station 105. At the Physical (PHY) layer, transport channels may be mapped to physical channels.

Wireless communications system 100 may utilize both licensed and unlicensed radio frequency spectrum bands. For example, wireless communications system 100 may employ an LTE License Assisted Access (LTE-LAA) or an LTE Unlicensed (LTE U) RAT or NR technology in an unlicensed band such as the 5 Ghz Industrial, Scientific, and Medical (ISM) band. When operating in unlicensed radio frequency spectrum bands, wireless devices such as base stations 105, UEs 115, and DSRC devices 120 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, and sidelink transmissions. Duplexing in unlicensed spectrum may be based on frequency division duplexing (FDD), time division duplexing (TDD), or a combination of both.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases, a frame structure used for communications in some wireless communications systems (e.g., NR systems) may differ from the frame structure used in LTE. In some examples the subframe may be the smallest scheduling unit, also known as a TTI. In other cases, a TTI may be shorter than a subframe or may be dynamically selected (e.g., in short TTI bursts or in selected component carriers using short TTIs). The frame structure may be the same or different for uplink transmissions, downlink transmissions, and sidelink transmissions.

Wireless communications system 100 may support direct communication between UEs 115 or between UEs 115 and DSRC devices 120 over a sidelink (e.g., using a P2P or D2D protocol). Sidelink communication may be used for D2D media-sharing, V2V communication, V2X communication, emergency rescue applications, etc. In some aspects, a first set of UEs 115 may communicate over sidelink connections using a first RAT and a second set of wireless devices, such as DSRC devices 120, may communicate over sidelink connections using a second RAT. For example, for V2X communications, the first set of UEs 115 may support C-V2X communications via a cellular network and the second set of wireless devices may support DSRC via a WLAN.

Wireless communications system 100 may support efficient techniques for facilitating C-V2X communications and DSRC in a shared wireless spectrum. Specifically, when a UE 115 supporting C-V2X communications is scheduled to transmit or receive a C-V2X data transmission on a set of resources over the shared wireless spectrum, the UE 115 may transmit a message via the WLAN indicating that the C-V2X transmission is to occur on the set of resources. Accordingly, a DSRC device 120 supporting DSRC may receive the message and determine to refrain from communicating on the set of resources, thus reducing interference between C-V2X communications and DSRC in wireless communications system 100.

Figure 2:
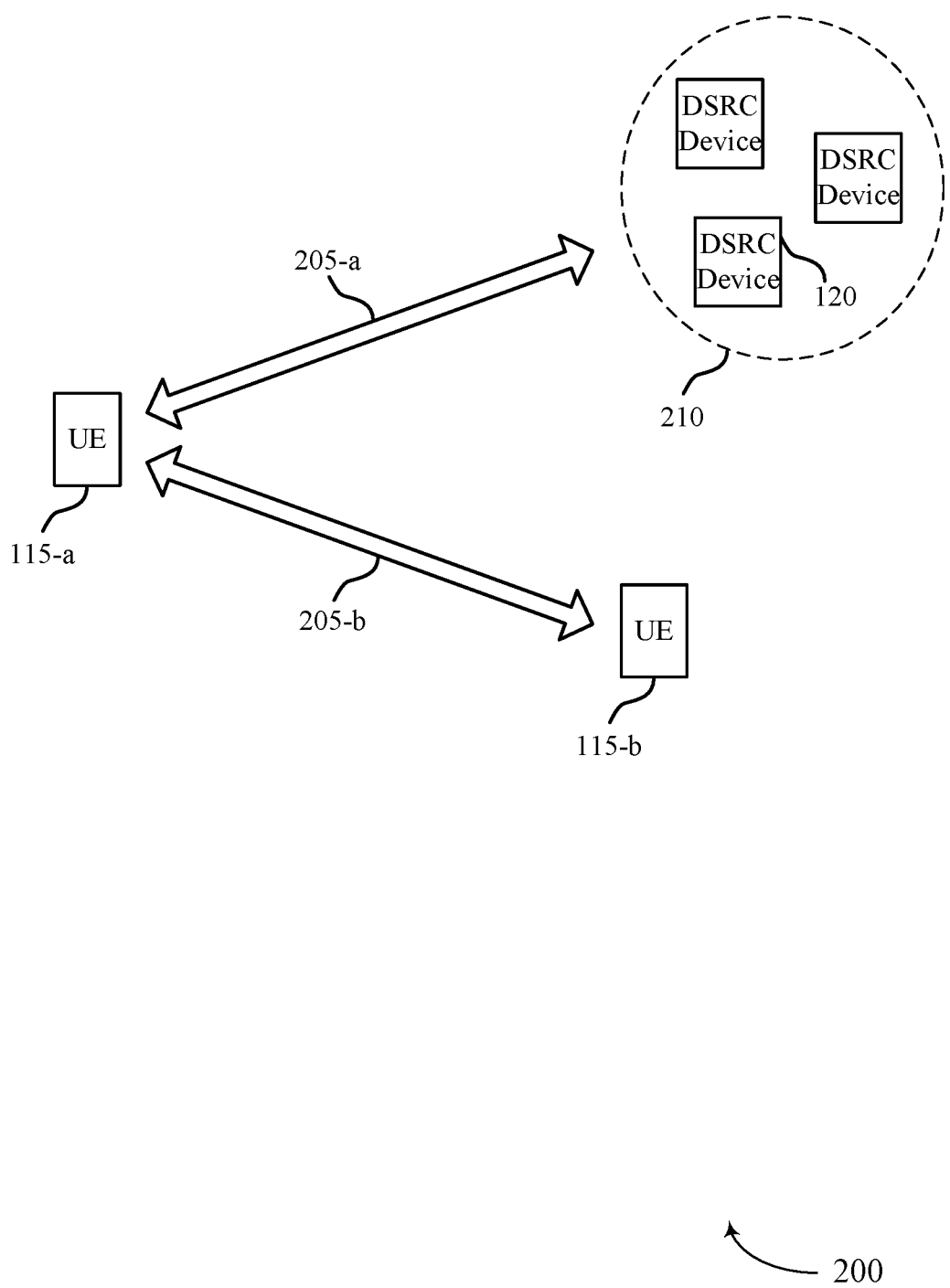

FIG. 2 illustrates an example of a wireless communications system 200 that supports synchronous CTS signaling in accordance with one or more aspects of the present disclosure. Wireless communications system 200 includes UE 115-a, UE 115-b, and a set 210 of DSRC devices 120. UE 115-a and UE 115-b may be examples of a UE 115 described with reference to FIG. 1. The set 210 of DSRC devices 120 may be examples of a DSRC device 120 described with reference to FIG. 1. UE 115-a may communicate with one or more DSRC devices 120 in the set 210 via communication link 205-a, and UE 115-a may communicate with UE 115-b via communication link 205-b. Wireless communications system 200 may implement aspects of wireless communications system 100.

In the example of FIG. 2, UE 115-a and UE 115-b may support C-V2X communications, and one or more DSRC devices 120 in the set 210 may support DSRC. In some cases, UE 115-a may be scheduled to transmit data to UE 115-b on one or more wireless channels (e.g., WLAN wireless channels of a shared wireless spectrum) via communication link 205-b during a time period (e.g., one or more TTIs). In addition, in some examples, one or more DSRC devices 120 in the set 210 supporting DSRC may also be configured to communicate (e.g., using Wi-Fi) on overlapping wireless channels during the same time period. In such examples, the DSRC may interfere with the C-V2X communications, resulting in reduced throughput in a wireless communications system.

Wireless communications system 200 may support efficient techniques for mitigating the interference between C-V2X communications and DSRC. Specifically, when UE 115-a is scheduled to transmit or receive data on a set of resources on a shared wireless spectrum, UE 115-a may be configured to transmit a message (e.g., a CTS message not in response to a request to send (RTS) message) indicating that a data transmission is to occur on the set of resources. In order to ensure that the message is decodable by a device supporting DSRC, UE 115-a may transmit the message using a format that is decodable by devices supporting DSRC. For example, UE 115-a may transmit a Wi-Fi preamble, Wi-Fi control packet, or the like, that indicates that the data transmission is to occur on the set of resources. Accordingly, one or more DSRC devices 120 within the set 210 may receive the message and determine to refrain from communicating on the set of resources.

Figure 3:
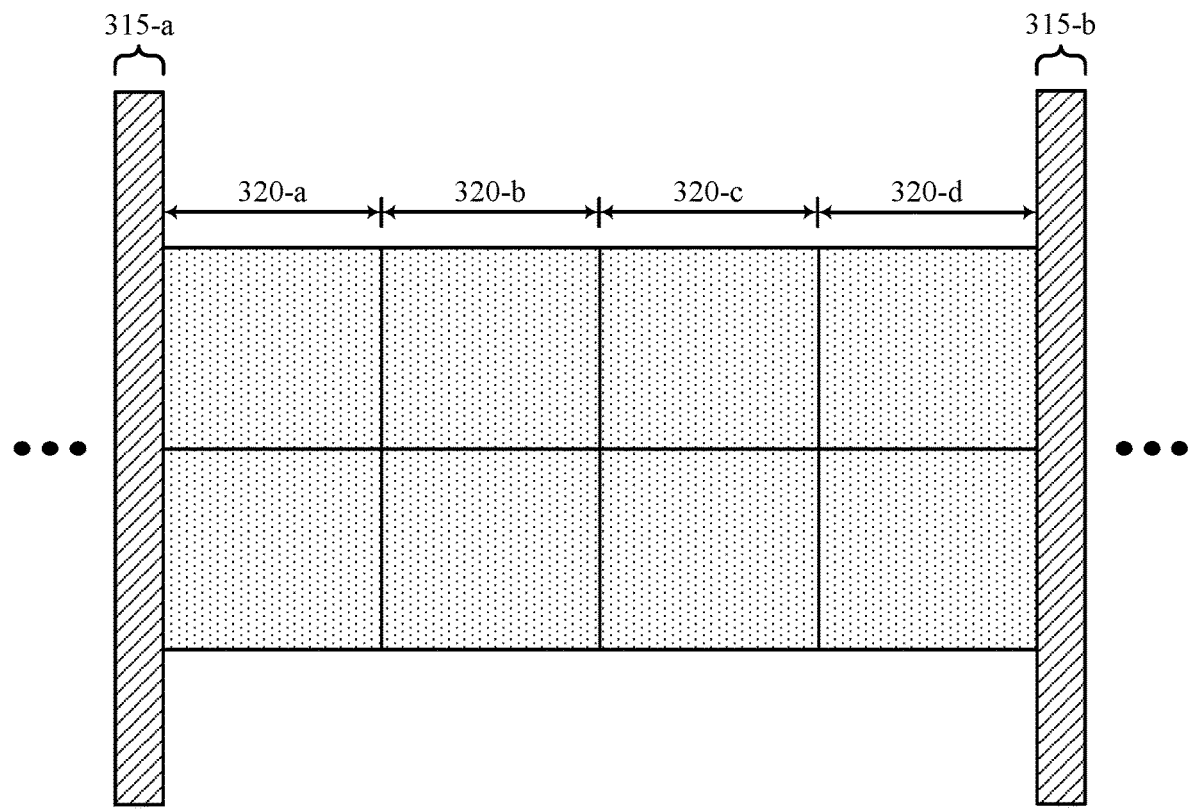
FIG. 3 illustrates an example of resources used by a UE for CTS signaling in accordance with one or more aspects of the present disclosure.

FIG. 3 illustrates an example of resources 300 used by UE 115-a to transmit data and control information 305 and one or more CTS messages 310 (e.g., such as a CTS message described with reference to FIG. 2) to other wireless devices in accordance with one or more aspects of the present disclosure. As described with reference to FIG. 2, when UE 115-a is scheduled to transmit or receive data on a set of resources on a shared wireless spectrum, UE 115-a may be configured to transmit a message (e.g., CTS message 310) indicating that the data transmission is to occur on the set of resources (e.g., during one or more TTIs). In some examples, UE 115-a may indicate the number of TTIs (e.g., some or all of TTIs 320) or the duration of a time period to be used for the data transmission in the message (e.g., the CTS message 310). As such, a DSRC device 120 of the set 210 may receive the CTS message 310 and determine to refrain from communicating on the set of resources during the TTIs or during the time period to avoid interfering with the data transmission. CTS message 310 may be referred to as a Wi-Fi preamble, a Wi-Fi control packet, a V2X-CTS packet, etc.

In some cases, UE 115-a may transmit CTS message 310 across a band of frequencies that overlaps with and is wider than the band of frequencies to be used for the data transmission during TTIs 320. By transmitting the CTS message 310 across a wide frequency band, UE 115-a may increase the likelihood that a DSRC device 120 may receive the CTS message 310. Further, if the data transmission spans multiple channels (e.g., multiple Wi-Fi channels), UE 115-a may transmit multiple CTS messages 310 simultaneously (i.e., in parallel) to cover all bands to be used for the data transmission. Accordingly, a DSRC device 120 of the set 210 may be able to determine which channels will be used for the data transmission to/from UE 115-a (e.g., based on the channels spanned by the CTS messages 310) during a number of TTIs or during a time period specified in the CTS messages 310. Also, the DSRC device 120 may refrain from communicating on these channels during the TTIs or during the time period.

As illustrated in FIG. 3, UE 115-a may be configured with resources based on a predefined schedule (e.g., periodic resources) to use to transmit one or more CTS messages 310. In addition, other UEs (i.e., UEs other than UE 115-a) may also be configured to use these resources to transmit CTS messages prior to transmitting and/or receiving data. Thus, the transmission of the CTS message 310 from UE 115-a may be a part of a synchronous transmission (e.g., a single frequency network (SFN) transmission) from multiple UEs. For example, multiple transmissions of CTS messages 310 from multiple UEs may be synchronized according to a global clock (e.g., a global positioning system (GPS) clock). In addition, each of the CTS messages 310 may include a receiver address set as a common broadcast address such that each of the CTS messages may be decodable by multiple users.

In some cases, the amount of resources allocated for UEs (e.g., including UE 115-a) to use to transmit CTS messages 310 may depend on a periodicity of the resource allocation (e.g., a number of TTIs between each resource allocation) or based on an expected transmission duration for one or more CTS messages 310. In such cases, the amount of resources allocated for CTS message transmissions (e.g., a number of symbols) and the periodicity of the resource allocation (e.g., a number of TTIs) may be configured by a network. For example, a UE 115 may be configured with a network configurable parameter that may be used by a network to configure the UE 115-a with a certain amount of resources to use to transmit CTS messages 310 periodically.

In the example of FIG. 3, UE 115-a (and other UEs) may be configured with resources to use to transmit CTS messages 310 every four TTIs 320. Specifically, UE 115-a (and other UEs 115) may be configured to use two symbols (e.g., two 0.35 µs symbols) for CTS message transmissions across a wide frequency band every four TTIs 320 (e.g., each having a duration of 0.5 ms). Thus, a frame length used for communications between UEs may be equal to 2.07 ms. Accordingly, in this example and others, a base station may configure C-V2X UEs (e.g., UE 115-a) to operate based on the new frame length such that these UEs may remain synchronized with every TTI.

In some instances, in order to support the techniques described above for mitigating interference in wireless communications system 200, UE 115-a may have to transition between wideband and narrowband transmissions frequently. For example, UE 115-a may be scheduled to transmit one or more CTS messages 310 over a wide frequency band during symbols 315, and the UE 115-a may be scheduled to transmit data and/or other control information during subsequent TTIs 320 over a narrow frequency band. In this example, UE 115-a may have to transition from the wideband transmission to the narrowband transmission, and it may be challenging for a transmit chain at the UE 115-a to support such a transition. As described herein, UE 115-a may support techniques to limit the number of times that the UE 115-a has to transition between a wideband CTS message transmission and a narrowband data transmission.

As an example, when UE 115-a is scheduled for a data transmission during TTIs 320-c, 320-d, and subsequent TTIs, UE 115-a may identify that the UE 115-a is also scheduled for a CTS message transmission during symbols 315-b between TTI 320-d and the subsequent TTIs. Accordingly, UE 115-a may postpone the data transmission until after the CTS message transmission during the symbols 315-b. That is, UE 115-a may determine that the time period designated for transmitting the CTS message 310 is between two TTIs allocated for a data transmission, and UE 115-a may postpone the data transmission based on the determination. By postponing the data transmission, UE 115-a may avoid a transition from a narrowband transmission to a wideband transmission. As a result, UE 115-a may save power.

Although the examples described above discuss that the techniques are performed by UEs supporting C-V2X communications and wireless devices supporting DSRC, the techniques described above may be implemented for different wireless devices communicating using any two different RATs. Further, although the examples described above discuss the use of a CTS message to indicate the resources to be used for a data transmission, it is to be understood that the CTS message may be any other message that indicates the same information and is decodable by a device supporting Wi-Fi communications. In addition, although UE 115-a may be capable of transmitting messages using a different RAT from the RAT that it is configured to use for data transmissions, UE 115-a may or may not be capable of receiving and decoding messages using the different RAT.

Figure 4:
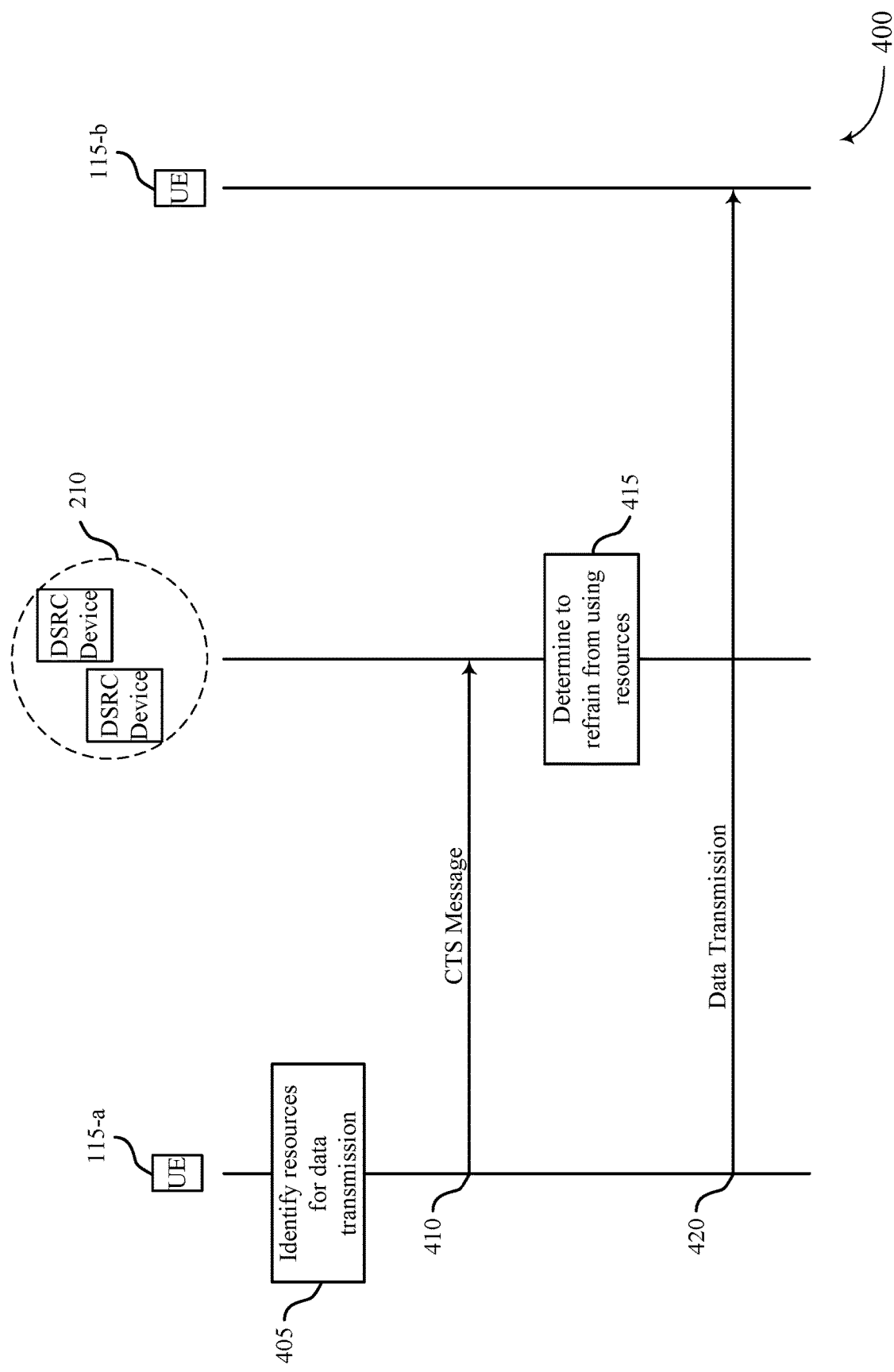
FIG. 4 illustrates an example of a process flow in a system that supports synchronous CTS signaling in accordance with one or more aspects of the present disclosure.

FIG. 4 illustrates an example of a process flow 400 that supports synchronous CTS signaling in accordance with one or more aspects of the present disclosure. Process flow 400 illustrates aspects of techniques performed by a UE 115-a and a UE 115-b, which may be examples of a UE 115 described with reference to FIGS. 1-3. Process flow 400 also illustrates aspects of techniques performed by a set 210 of DSRC devices 120, which may be an example of a set 210 of DSRC devices 120 described with reference to FIG. 2. In the example of FIG. 4, UE 115-a and UE 115-b may support communications using a first RAT, and one or more DSRC device 120 in the set 210 may support communications using a second RAT. In some cases, the communications using the first RAT may be prioritized over the communications using the second RAT.

At 405, UE 115-a may identify a wireless channel for a data transmission using a first RAT during a first time period. At 410, UE 115-a may transmit a CTS message using a second RAT (e.g., via a WLAN) indicating that the data transmission is to occur during the first time period. In some cases, UE 115-a may receive a configuration parameter (e.g., from a base station) indicating whether to transmit the message (i.e., this functionality may be configurable). In some cases, the second RAT may be different from the first RAT, and the message may be transmitted during a second time period designated for second RAT transmissions by one or more UEs. In some cases, UE 115-b may transmit the CTS message across a first band of frequencies that overlaps with and is wider than a second band of frequencies used for the data transmission.

In some cases, UE 115-a may transmit multiple CTS messages simultaneously during the second time period using the second RAT across respective first bands of frequencies that overlap with and are collectively wider than a second band of frequencies used for the data transmission. In some examples, the CTS message may indicate a duration of the first time period to be used for the data transmission, and the duration of the first time period may be based on an expected duration of the data transmission. Further, the CTS message transmitted by UE 115-a at 410 may include a common broadcast address as a receiver address such that one or more DSRC devices 120 in the set 210 may be able to receive and decode the CTS message.

At 415 (i.e., after receiving the CTS message from UE 115-a at 410), one or more DSRC devices 120 in the set 210 may determine to refrain from using the resources to be used for the data transmission from UE 115-a to avoid interfering with the data transmission from UE 115-a. In some cases, one or more DSRC devices 120 in the set 210 may receive the CTS message from multiple UEs 115 (i.e., including UE 115-b) as part of a synchronous transmission. At 420, UE 115-a may transmit the data transmission to UE 115-b (e.g., a UE 115 also using the first RAT) over the wireless channel during the first time period.

Although not illustrated, UE 115-b may also transmit a CTS message prior to receiving the data transmission from UE 115-a. That is, either UE 115-a (i.e., a transmitting UE 115), UE 115-b (e.g., a receiving UE 115), or both UE 115-a and UE 115-b may transmit the CTS message prior to transmitting or receiving a data transmission over the wireless channel during the first time period. Further, although not illustrated as vehicles, UE 115-a and UE 115-b may be examples of vehicles, and the data transmission at 420 may be an example of a C-V2X data transmission. Additionally, although the message at 410 is described as a CTS message, it is to be understood that the message may be an example of a preamble (e.g., a Wi-Fi preamble), a Wi-Fi control packet, or any other message that can be received and decoded by a Wi-Fi device.

Figure 5:
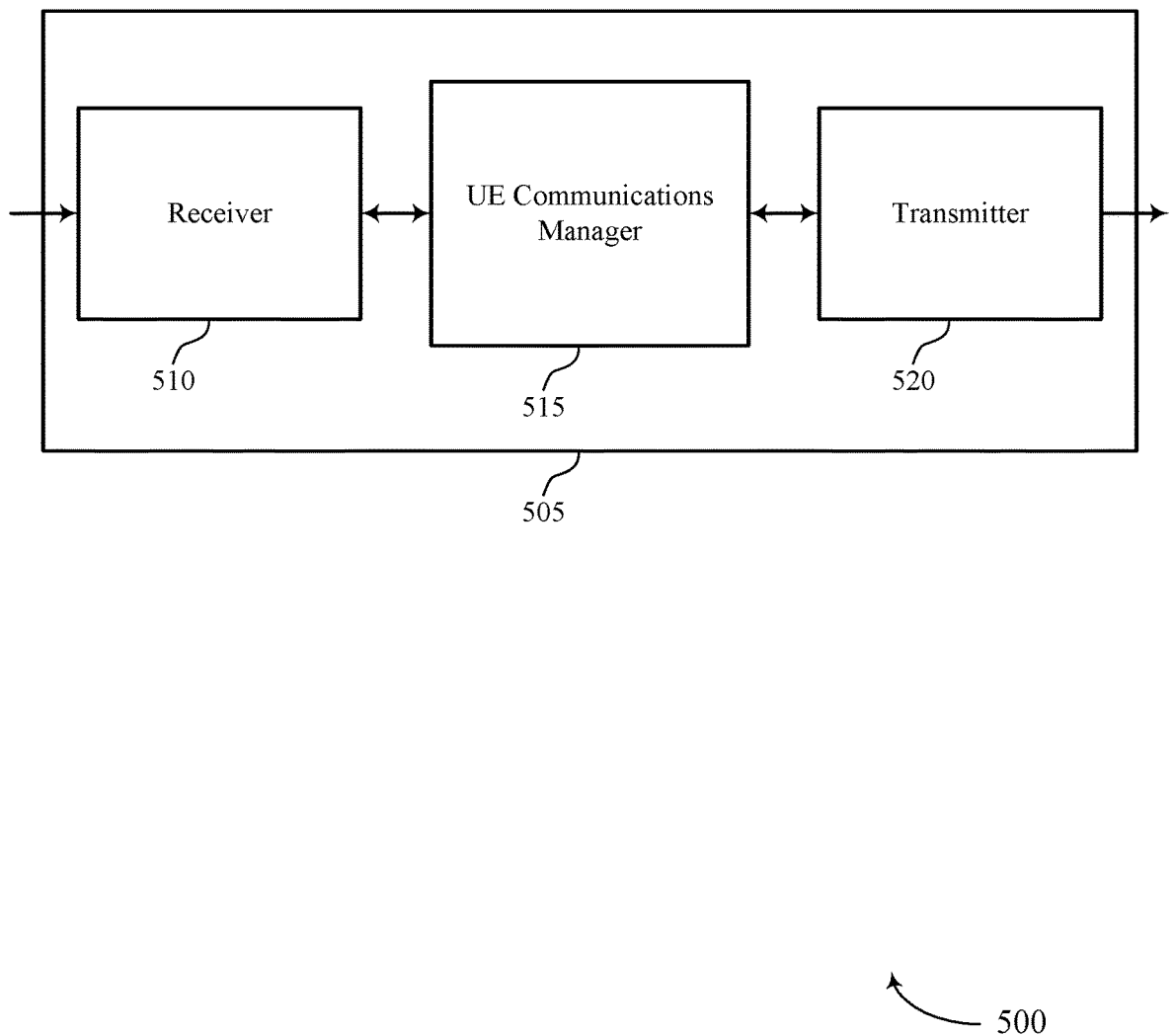
FIGS. 5 and 6 show block diagrams of a device that supports synchronous CTS signaling in accordance with one or more aspects of the present disclosure.

FIG. 5 shows a block diagram 500 of a wireless device 505 that supports synchronous CTS signaling in accordance with one or more aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to synchronous CTS signaling, etc.). Information may be passed on to other components of the device. The receiver 510 may be an example of aspects of the transceiver 735 described with reference to FIG. 7. The receiver 510 may utilize a single antenna or a set of antennas.

UE communications manager 515 may be an example of aspects of the UE communications manager 715 described with reference to FIG. 7. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with one or more aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with one or more aspects of the present disclosure.

UE communications manager 515 may identify a wireless channel allocated for a data transmission using a first RAT during a first time period, transmit a message using a second RAT indicating that the data transmission is to occur during the first time period, the second RAT being a WLAN and being different from the first RAT, the message being transmitted during a second time period designated for second RAT transmissions by one or more UEs, and transmit or receive the data transmission over the wireless channel during the first time period.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
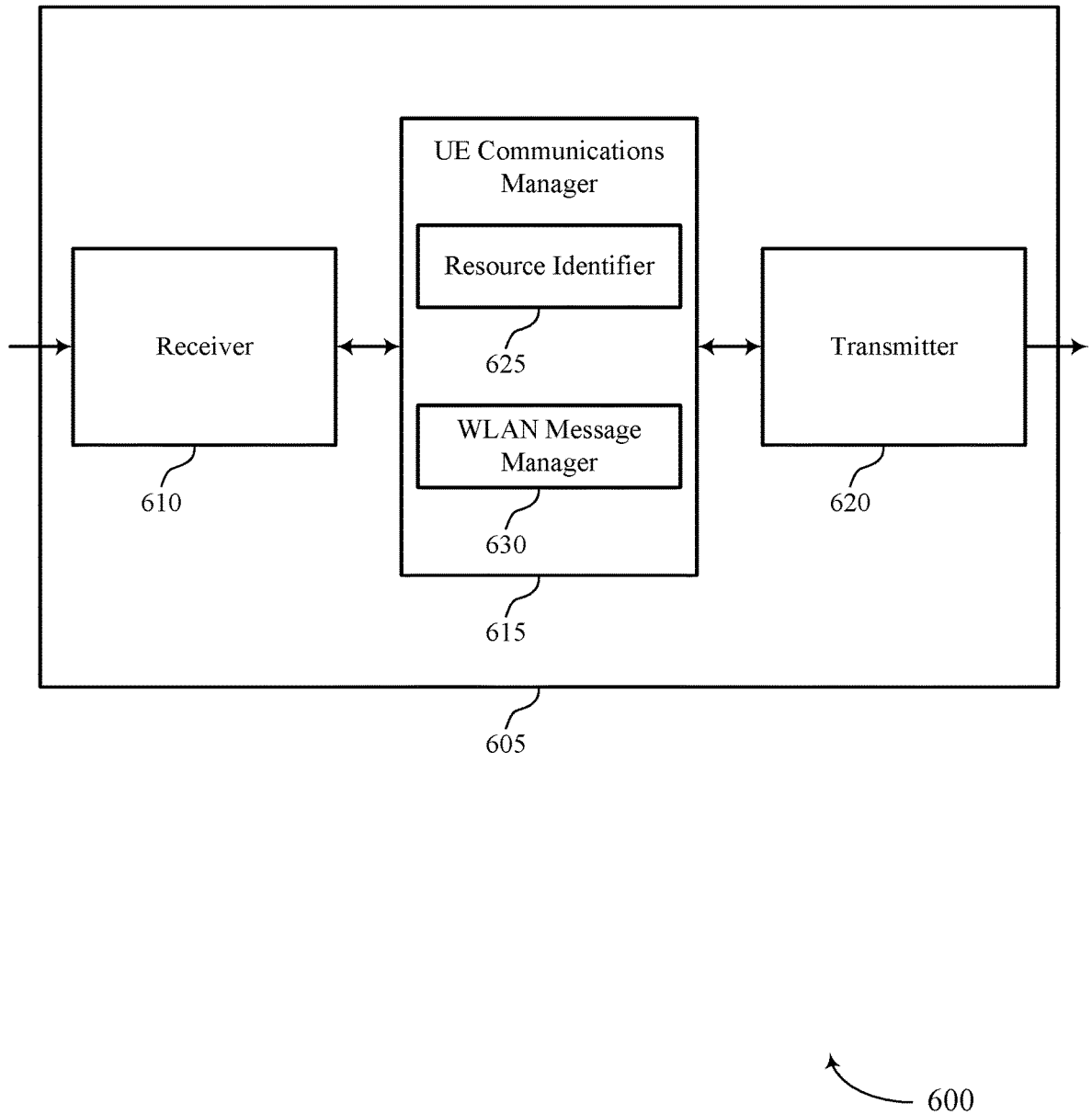

FIG. 6 shows a block diagram 600 of a wireless device 605 that supports synchronous CTS signaling in accordance with one or more aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to synchronous CTS signaling, etc.). Information may be passed on to other components of the device. The receiver 610 may be an example of aspects of the transceiver 735 described with reference to FIG. 7. The receiver 610 may utilize a single antenna or a set of antennas.

UE communications manager 615 may be an example of aspects of the UE communications manager 715 described with reference to FIG. 7. UE communications manager 615 may include resource identifier 625 and WLAN message manager 630. Resource identifier 625 may identify a wireless channel allocated for a data transmission using a first RAT during a first time period. WLAN message manager 630 may transmit a message using a second RAT indicating that the data transmission is to occur during the first time period, the second RAT being a WLAN and being different from the first RAT, the message being transmitted during a second time period designated for second RAT transmissions by one or more UEs. UE communications manager 615 may then transmit or receive the data transmission over the wireless channel during the first time period.

In some cases, resource identifier 625 may identify that the second time period designated for transmitting the message overlaps with the first time period allocated for the data transmission, and resource identifier 625 may determine to postpone transmission of the data transmission until after the second time period designated for transmitting the message based on the identification. In some cases, the data transmission includes a V2X transmission. In some cases, WLAN message manager 630 may receive a configuration parameter indicating whether to transmit the message. In some cases, transmitting the message includes transmitting the message across a first band of frequencies that overlaps with and is wider than a second band of frequencies used for the data transmission (e.g., using transmitter 620 or receiver 610).

In some cases, transmitting the message includes transmitting multiple messages simultaneously during the second time period using the second RAT across respective first bands of frequencies that overlap with and are collectively wider than a second band of frequencies used for the data transmission. In some cases, the message includes a common broadcast address as a receiver address. In some cases, the message indicates a duration of the first time period. In some cases, the duration of the first time period is based on an expected duration of the data transmission. In some cases, the second time period is synchronized to a global clock. In some cases, the second time period spans one or more symbols. In some cases, the message includes a CTS message. In some cases, the message includes a Wi-Fi control packet.

In some cases, transmitting the message includes transmitting a preamble during the second time period, where the second time period is prior to the first time period and the preamble is transmitted using the second RAT.

Transmitter 620 may transmit signals generated by other components of the device. In some examples, the transmitter 620 may be collocated with a receiver 610 in a transceiver module. For example, the transmitter 620 may be an example of aspects of the transceiver 735 described with reference to FIG. 7. The transmitter 620 may utilize a single antenna or a set of antennas.

Figure 7:
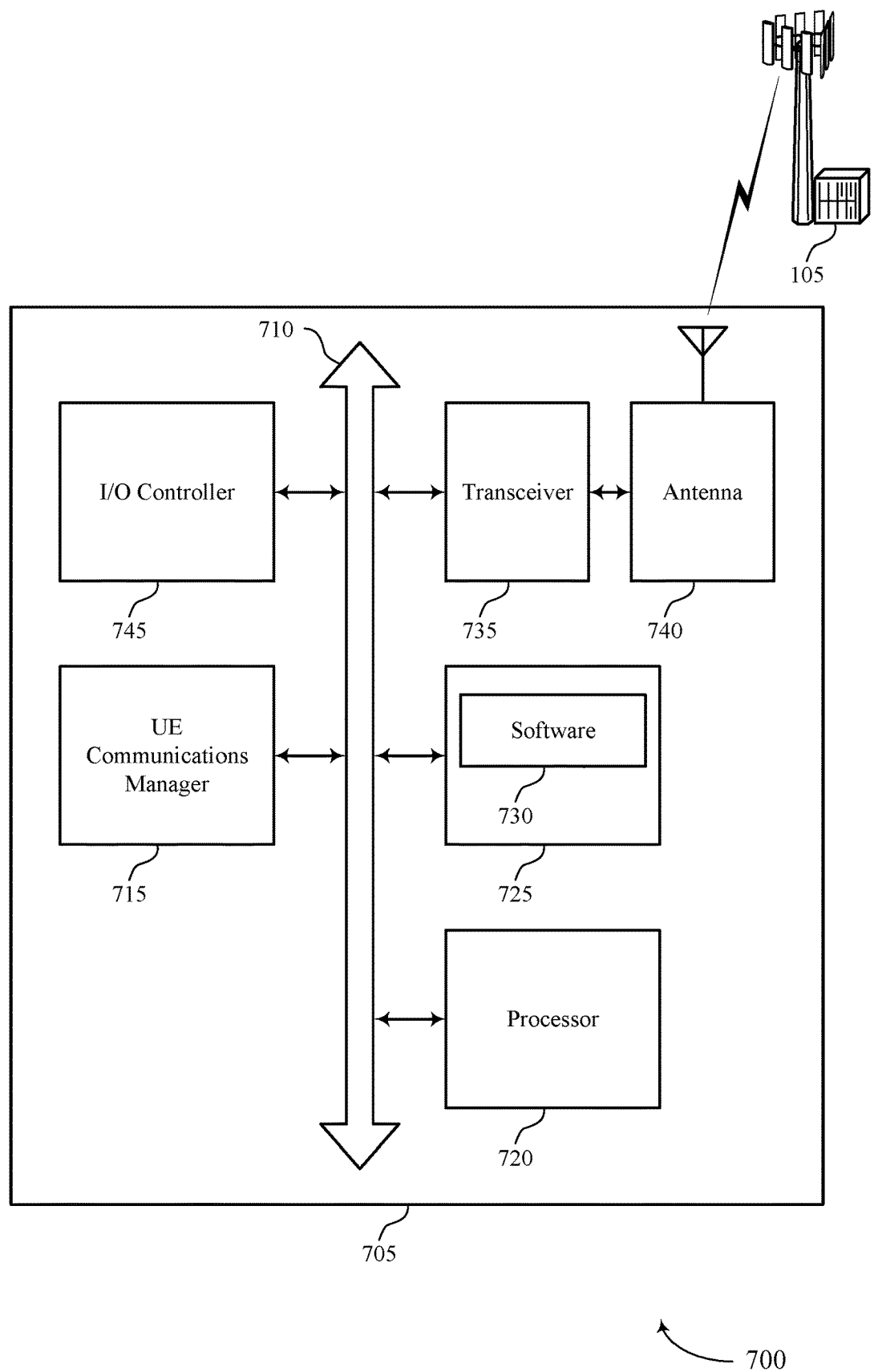
FIG. 7 illustrates a block diagram of a system including a UE that supports synchronous CTS signaling in accordance with one or more aspects of the present disclosure.

FIG. 7 shows a diagram of a system 700 including a device 705 that supports synchronous CTS signaling in accordance with one or more aspects of the present disclosure. Device 705 may be an example of or include the components of wireless device 505, wireless device 605, or a UE 115 as described above, e.g., with reference to FIGS. 5 and 6. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting synchronous CTS signaling).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support synchronous CTS signaling. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
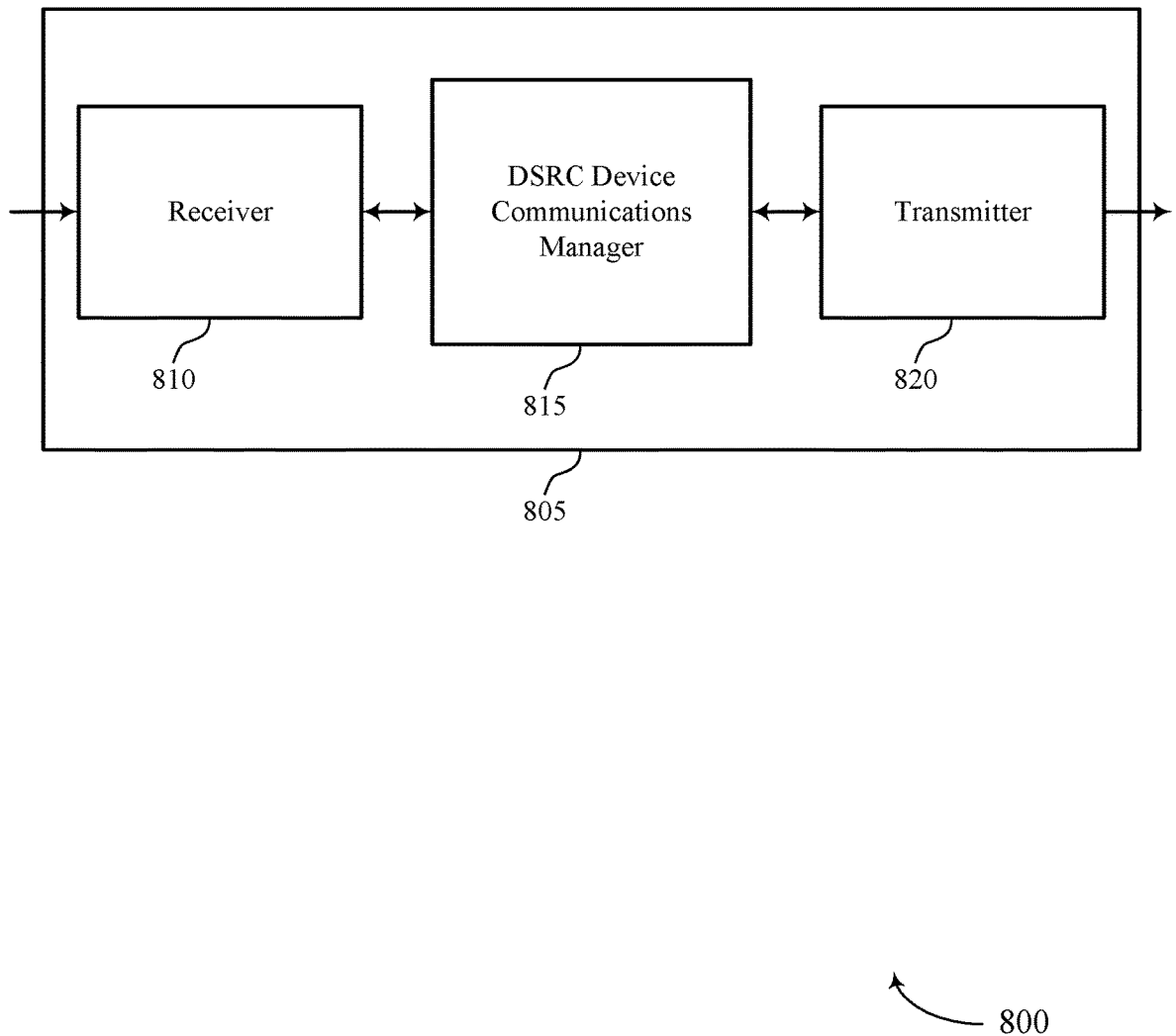
FIGS. 8 and 9 show block diagrams of a device that supports synchronous CTS signaling in accordance with one or more aspects of the present disclosure.

FIG. 8 shows a block diagram 800 of a wireless device 805 that supports synchronous CTS signaling in accordance with one or more aspects of the present disclosure. Wireless device 805 may be an example of aspects of a DSRC device 120 as described herein. Wireless device 805 may include receiver 510, DSRC device communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to synchronous CTS signaling, etc.). Information may be passed on to other components of the device. The receiver 810 may be an example of aspects of the transceiver 1035 described with reference to FIG. 10. The receiver 810 may utilize a single antenna or a set of antennas.

DSRC device communications manager 815 may be an example of aspects of the DSRC device communications manager 1015 described with reference to FIG. 10. DSRC device communications manager 815 and/or at least some of its various sub-components may be implemented in hardware, software executed by a processor, firmware, or any combination thereof. If implemented in software executed by a processor, the functions of the DSRC device communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The DSRC device communications manager 815 and/or at least some of its various sub-components may be physically located at various positions, including being distributed such that portions of functions are implemented at different physical locations by one or more physical devices. In some examples, DSRC device communications manager 815 and/or at least some of its various sub-components may be a separate and distinct component in accordance with one or more aspects of the present disclosure. In other examples, DSRC device communications manager 815 and/or at least some of its various sub-components may be combined with one or more other hardware components, including but not limited to an I/O component, a transceiver, a network server, another computing device, one or more other components described in the present disclosure, or a combination thereof in accordance with one or more aspects of the present disclosure.

DSRC device communications manager 815 may receive a message indicating that a data transmission is to occur over a wireless channel during a first time period using a first RAT, the message being received using a second RAT that is a WLAN, the first RAT being different from the second RAT, the message being transmitted during a second time period designated for transmissions of messages using the second RAT by one or more UEs and refrain from communicating over the wireless channel during the first time period based on receiving the message.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
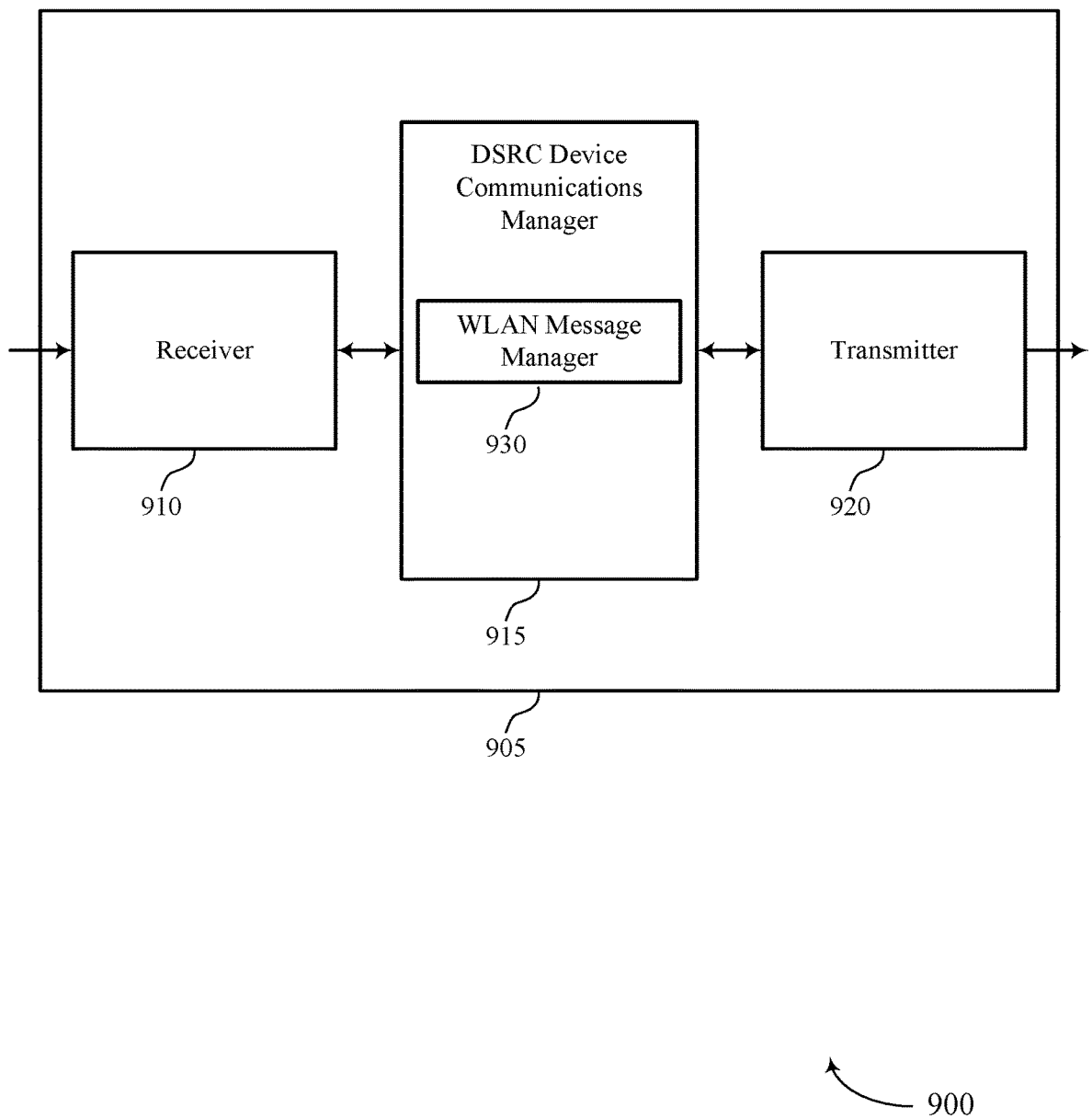

FIG. 9 shows a block diagram 900 of a wireless device 905 that supports synchronous CTS signaling in accordance with one or more aspects of the present disclosure. Wireless device 905 may be an example of aspects of a wireless device 805 or a DSRC device 120 as described with reference to FIG. 8. Wireless device 905 may include receiver 910, DSRC device communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to synchronous CTS signaling, etc.). Information may be passed on to other components of the device. The receiver 910 may be an example of aspects of the transceiver 1035 described with reference to FIG. 10. The receiver 910 may utilize a single antenna or a set of antennas.

DSRC device communications manager 915 may be an example of aspects of the DSRC device communications manager 1015 described with reference to FIG. 10. DSRC device communications manager 915 may include a WLAN message manager 930.

In some cases, WLAN message manager 930 may receive a message indicating that a data transmission is to occur over a wireless channel during a first time period using a first RAT, the message being received using a second RAT that is a WLAN, the first RAT being different from the second RAT, the message being transmitted during a second time period designated for transmissions of messages using the second RAT by one or more UEs. Accordingly, DSRC device communications manager 915 may refrain from communicating over the wireless channel during the first time period based on receiving the message.

In some cases, receiving the message includes receiving the message from multiple UEs as part of a synchronous transmission. In some cases, receiving the message includes receiving a preamble during the second time period and using the second RAT, where the second time period is prior to the first time period. In some cases, receiving the message includes receiving the message across a first band of frequencies that overlaps with and is wider than a second band of frequencies used for the data transmission. In some cases, receiving the message includes receiving multiple messages simultaneously during the second time period using the second RAT across respective first bands of frequencies that overlap with and are collectively wider than a second band of frequencies used for the data transmission.

Transmitter 920 may transmit signals generated by other components of the device. In some examples, the transmitter 920 may be collocated with a receiver 910 in a transceiver module. For example, the transmitter 920 may be an example of aspects of the transceiver 1035 described with reference to FIG. 10. The transmitter 920 may utilize a single antenna or a set of antennas.

Figure 10:
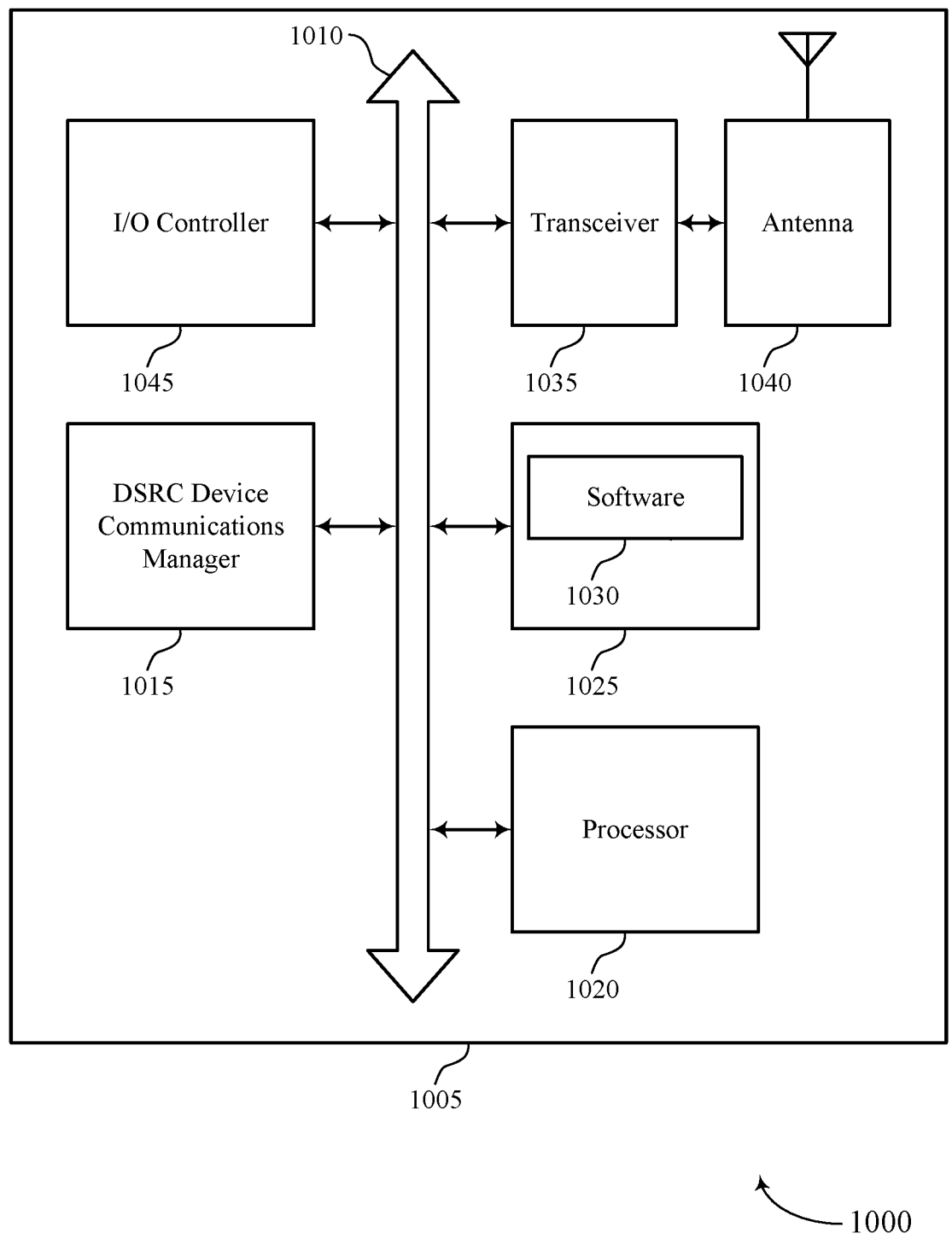
FIG. 10 illustrates a block diagram of a system including a dedicated short range communications (DSRC) device that supports synchronous CTS signaling in accordance with one or more aspects of the present disclosure.

FIG. 10 shows a diagram of a system 1000 including a device 1005 that supports synchronous CTS signaling in accordance with one or more aspects of the present disclosure. Device 1005 may be an example of or include the components of wireless device 805, wireless device 905, or a DSRC device 120 as described above, e.g., with reference to FIGS. 8 and 9. Device 1005 may include components for bi-directional voice and data communications including components for transmitting and receiving communications, including DSRC device communications manager 1015, processor 1020, memory 1025, software 1030, transceiver 1035, antenna 1040, and I/O controller 1045. These components may be in electronic communication via one or more buses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting synchronous CTS signaling).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support synchronous CTS signaling. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
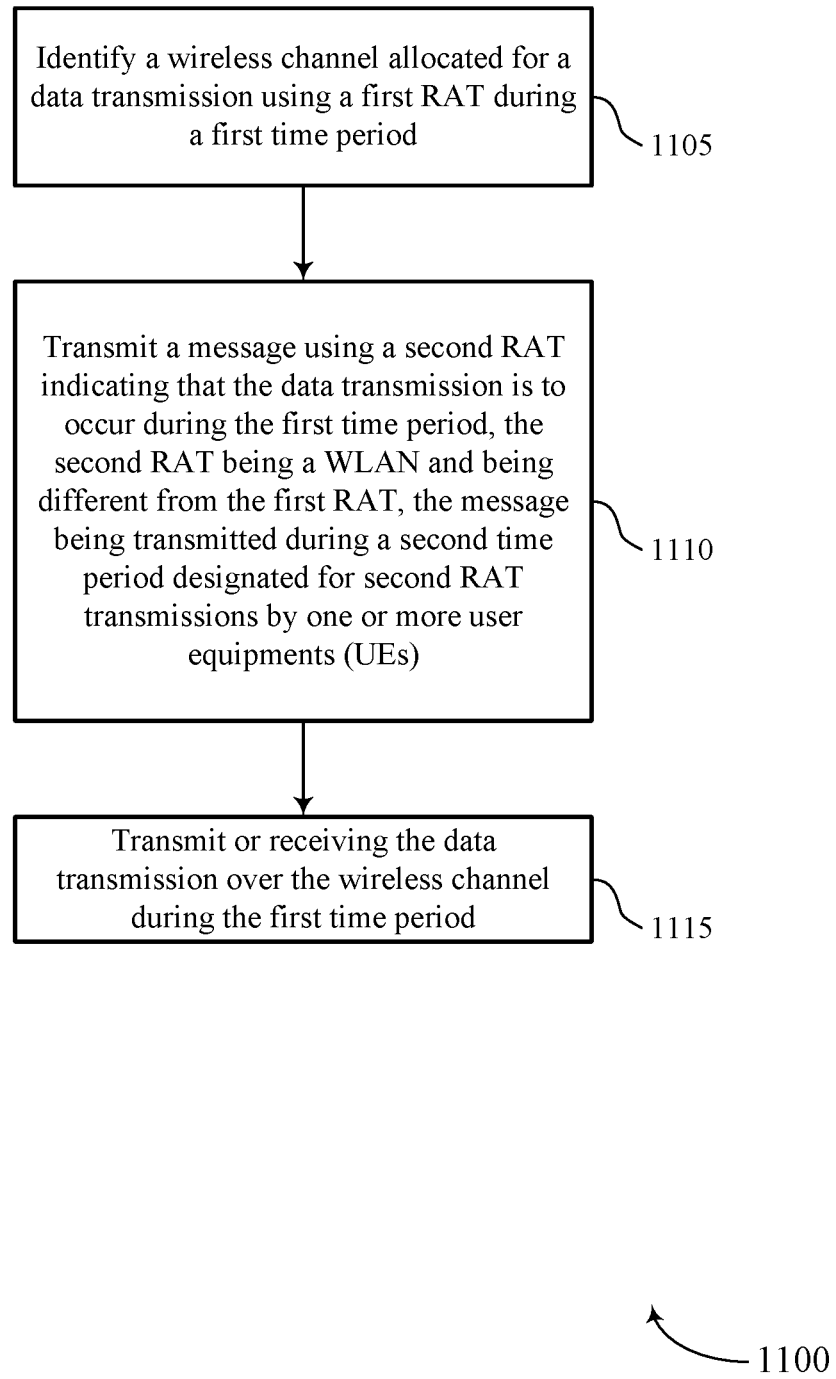
FIGS. 11 through 13 illustrate methods for synchronous CTS signaling in accordance with one or more aspects of the present disclosure.

FIG. 11 shows a flowchart illustrating a method 800 for synchronous CTS signaling in accordance with one or more aspects of the present disclosure. The operations of method 1100 may be implemented by a UE 115 or its components as described herein. For example, the operations of method 1100 may be performed by a communications manager as described with reference to FIGS. 5 through 7. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may identify a wireless channel allocated for a data transmission using a first RAT during a first time period. The operations of block 1105 may be performed according to the methods described herein. In certain examples, aspects of the operations of block 1105 may be performed by a resource identifier as described with reference to FIGS. 5 through 7.

At block 1110 the UE 115 may transmit a message using a second RAT indicating that the data transmission is to occur during the first time period, the second RAT being a WLAN and being different from the first RAT, the message being transmitted during a second time period designated for second RAT transmissions by one or more UEs. In some cases, the message may be a preamble (e.g., a Wi-Fi preamble). In some cases, transmitting the message includes transmitting the message across a first band of frequencies that overlaps and is wider than a second band of frequencies used for the data transmission.

In some cases, transmitting the message includes transmitting multiple messages simultaneously during the second time period using the second RAT across respective first bands of frequencies that overlap with and are collectively wider than a second band of frequencies used for the data transmission. The operations of block 1110 may be performed according to the methods described herein. In certain examples, aspects of the operations of block 1110 may be performed by a WLAN message manager as described with reference to FIGS. 5 through 7.

At block 1115 the UE 115 may transmit or receive the data transmission over the wireless channel during the first time period. The operations of block 1115 may be performed according to the methods described herein. In certain examples, aspects of the operations of block 1115 may be performed by a communications manager as described with reference to FIGS. 5 through 7.

Figure 12:
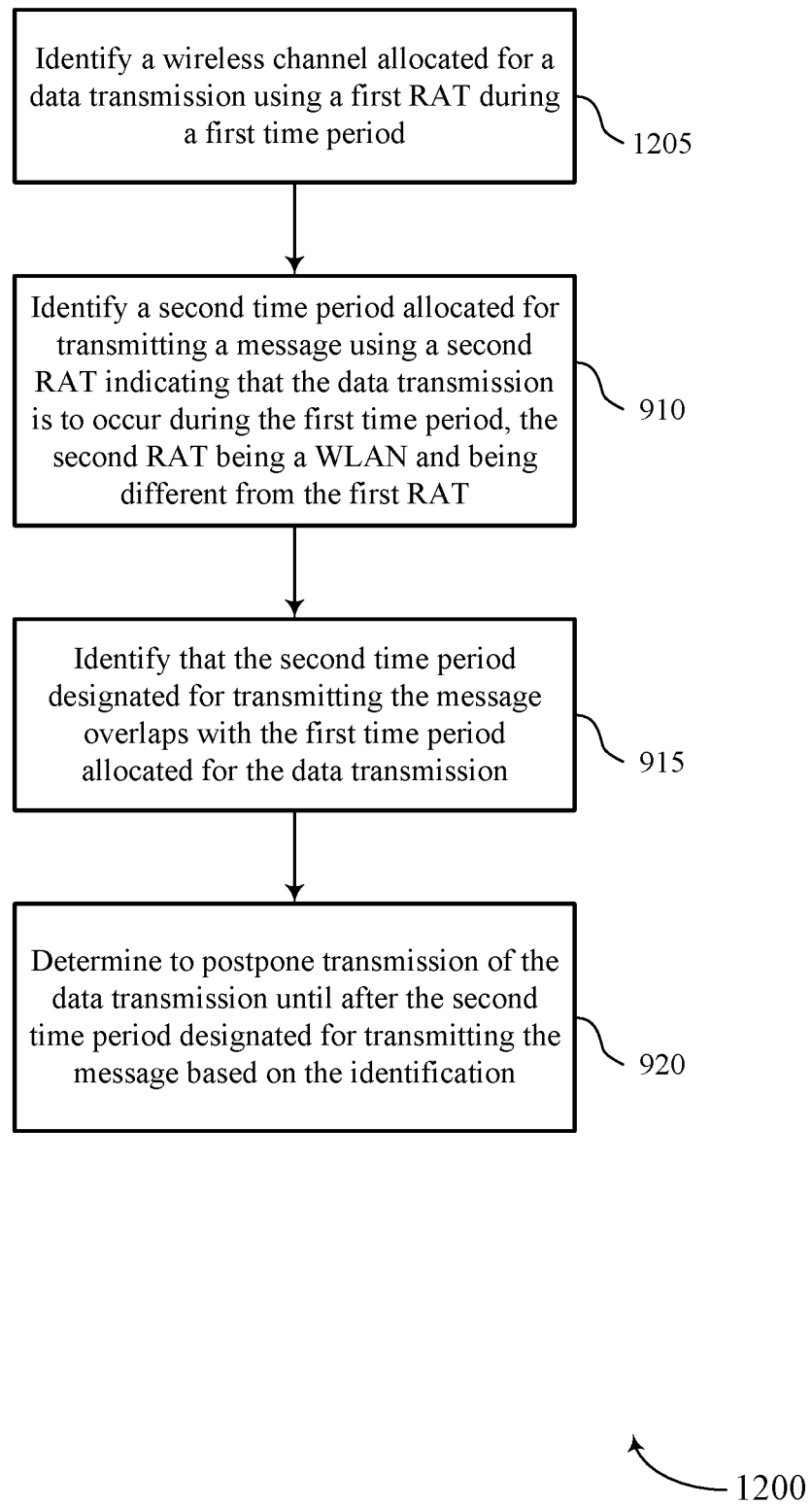

FIG. 12 shows a flowchart illustrating a method 1200 for synchronous CTS signaling in accordance with one or more aspects of the present disclosure. The operations of method 1200 may be implemented by a UE 115 or its components as described herein. For example, the operations of method 1200 may be performed by a communications manager as described with reference to FIGS. 5 through 7. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may identify a wireless channel allocated for a data transmission using a first RAT during a first time period. The operations of block 1205 may be performed according to the methods described herein. In certain examples, aspects of the operations of block 1205 may be performed by a resource identifier as described with reference to FIGS. 5 through 7.

At block 1210 the UE 115 may identify a second time period allocated for transmitting a message using a second RAT indicating that the data transmission is to occur during the first time period, the second RAT being a WLAN and being different from the first RAT. The operations of block 1210 may be performed according to the methods described herein. In certain examples, aspects of the operations of block 1210 may be performed by a WLAN message manager as described with reference to FIGS. 5 through 7.

At block 1215 the UE 115 may identify that the second time period designated for transmitting the message overlaps with the first time period allocated for the data transmission. The operations of block 1215 may be performed according to the methods described herein. In certain examples, aspects of the operations of block 1215 may be performed by a resource identifier as described with reference to FIGS. 5 through 7.

At block 1220 the UE 115 may determine to postpone transmission of the data transmission until after the second time period designated for transmitting the message based on the identification. The operations of block 1220 may be performed according to the methods described herein. In certain examples, aspects of the operations of block 1220 may be performed by a resource identifier as described with reference to FIGS. 5 through 7.

Figure 13:
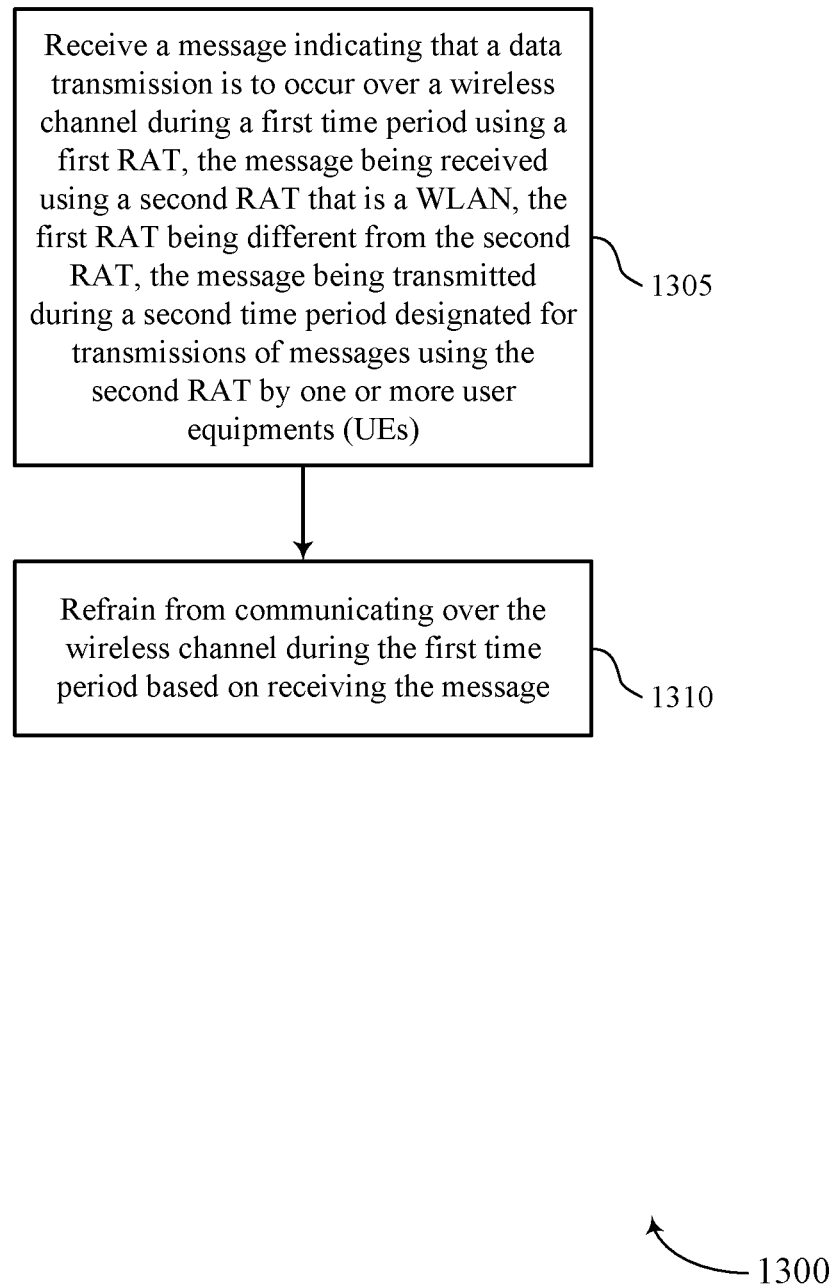

FIG. 13 shows a flowchart illustrating a method 1300 for synchronous CTS signaling in accordance with one or more aspects of the present disclosure. The operations of method 1300 may be implemented by a DSRC device 120 or its components as described herein. For example, the operations of method 1300 may be performed by a communications manager as described with reference to FIGS. 8 through 10. In some examples, a DSRC device 120 may execute a set of codes to control the functional elements of the device to perform the functions described below. Additionally or alternatively, the DSRC device 120 may perform aspects of the functions described below using special-purpose hardware.

At block 1305 the DSRC device 120 may receive a message indicating that a data transmission is to occur over a wireless channel during a first time period using a first RAT, the message being received using a second RAT that is a WLAN, the first RAT being different from the second RAT, the message being transmitted during a second time period designated for transmissions of messages using the second RAT by one or more UEs. In some cases, receiving the message includes receiving the message from multiple UEs as part of a synchronous transmission. In some cases, the message may be a preamble (e.g., a Wi-Fi preamble).

In some cases, receiving the message includes receiving the message across a first band of frequencies that overlaps with and is wider than a second band of frequencies used for the data transmission. In some cases, receiving the message includes receiving multiple messages simultaneously during the second time period using the second RAT across respective first bands of frequencies that overlap with and are collectively wider than a second band of frequencies used for the data transmission. The operations of block 1305 may be performed according to the methods described herein. In certain examples, aspects of the operations of block 1305 may be performed by a WLAN message manager as described with reference to FIGS. 8 through 10.

At block 1310 the DSRC device 120 may refrain from communicating over the wireless channel during the first time period based at least in part on receiving the message. The operations of block 1310 may be performed according to the methods described herein. In certain examples, aspects of the operations of block 1310 may be performed by a communications manager as described with reference to FIGS. 8 through 10.

It should be noted that the methods described above describe possible implementations, and that the operations may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like).

An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a wireless channel allocated for a data transmission to be transmitted using a first radio access technology (RAT) during a first time period;
   receiving a configuration parameter indicating whether to transmit, using a second RAT, a message that indicates that the data transmission is to occur via the first RAT and during the first time period;
   transmitting the message using the second RAT, the second RAT being a wireless local area network (WLAN) and being different from the first RAT, the message being transmitted during a second time period designated for second RAT transmissions by one or more user equipments (UEs) and based at least in part on the configuration parameter; and
   transmitting or receiving the data transmission over the wireless channel during the first time period using the first RAT.

2. The method of claim 1, wherein transmitting the message comprises:
   transmitting a preamble during the second time period, wherein the second time period is prior to the first time period and the preamble is transmitted using the second RAT.

3. The method of claim 1, wherein transmitting the message comprises:
   transmitting the message across a first band of frequencies that overlaps with and is wider than a second band of frequencies used for the data transmission.

4. The method of claim 1, wherein transmitting the message comprises:
   transmitting multiple messages simultaneously during the second time period using the second RAT across respective first bands of frequencies that overlap with and are collectively wider than a second band of frequencies used for the data transmission.

5. The method of claim 1, wherein the message comprises a common broadcast address as a receiver address.

6. The method of claim 1, further comprising:
   identifying that the second time period designated for transmitting the message overlaps with the first time period allocated for the data transmission; and
   determining to postpone transmission of the data transmission until after the second time period designated for transmitting the message based at least in part on the identification.

7. The method of claim 1, wherein the message indicates a duration of the first time period.

8. The method of claim 7, wherein the duration of the first time period is based on an expected duration of the data transmission.

9. The method of claim 1, wherein the second time period is synchronized to a global clock.

10. The method of claim 1, wherein the second time period spans one or more symbols.

11. The method of claim 1, wherein the message comprises a clear to send (CTS) message.

12. The method of claim 1, wherein the message comprises a wireless fidelity (Wi-Fi) control packet.

13. The method of claim 1, wherein the data transmission comprises a vehicle-to-everything (V2X) transmission.

14. A method for wireless communication, comprising:
    receiving a message indicating that a data transmission is to occur over a wireless channel during a first time period and transmitted using a first radio access technology (RAT) from multiple user equipments (UEs) as part of a synchronous transmission, the message being received using a second RAT that is a wireless local area network (WLAN), the first RAT being different from the second RAT, the message being transmitted during a second time period designated for transmissions of messages using the second RAT by the multiple UEs; and refraining from communicating over the wireless channel during the first time period based at least in part on receiving the message.

15. The method of claim 14, wherein receiving the message comprises:
receiving a preamble during the second time period and using the second RAT, wherein the second time period is prior to the first time period.

16. The method of claim 14, wherein receiving the message comprises:
receiving the message across a first band of frequencies that overlaps with and is wider than a second band of frequencies used for the data transmission.

17. The method of claim 14, wherein receiving the message comprises:
receiving multiple messages simultaneously during the second time period using the second RAT across respective first bands of frequencies that overlap with and are collectively wider than a second band of frequencies used for the data transmission.

18. The method of claim 14, wherein the message comprises a common broadcast address as a receiver address.

19. The method of claim 14, wherein the message indicates a duration of the first time period.

20. The method of claim 19, wherein the duration of the first time period is based on an expected duration of the data transmission.

21. An apparatus for wireless communication, comprising:
a processor;
memory coupled with the processor; and
instructions stored in the memory and operable, when executed by the processor, to cause the apparatus to:
identify a wireless channel allocated for a data transmission to be transmitted using a first radio access technology (RAT) during a first time period;
receive a configuration parameter indicating whether to transmit, using a second RAT, a message that indicates that the data transmission is to occur via the first RAT and during the first time period;
transmit the message using the second RAT, the second RAT being a wireless local area network (WLAN) and being different from the first RAT, the message being transmitted during a second time period designated for second RAT transmissions by one or more user equipments (UEs) and based at least in part on the configuration parameter; and
transmit or receiving the data transmission over the wireless channel during the first time period using the first RAT.

22. The apparatus of claim 21, wherein the instructions are further executable by the processor to:
transmit the message across a first band of frequencies that overlaps with and is wider than a second band of frequencies used for the data transmission.

23. The apparatus of claim 21, wherein the instructions are further executable by the processor to:
transmit multiple messages simultaneously during the second time period using the second RAT across respective first bands of frequencies that overlap with and are collectively wider than a second band of frequencies used for the data transmission.

24. The apparatus of claim 21, wherein the instructions are further executable by the processor to:
identify that the second time period designated for transmitting the message overlaps with the first time period allocated for the data transmission; and
determine to postpone transmission of the data transmission until after the second time period designated for transmitting the message based at least in part on the identification.

25. An apparatus for wireless communication, comprising:
a processor;
memory coupled with the processor; and
instructions stored in the memory and operable, when executed by the processor, to cause the apparatus to:
receive a message indicating that a data transmission is to occur over a wireless channel during a first time period and transmitted using a first radio access technology (RAT) from multiple user equipments (UEs) as part of a synchronous transmission, the message being received using a second RAT that is a wireless local area network (WLAN), the first RAT being different from the second RAT, the message being transmitted during a second time period designated for transmissions of messages using the second RAT by the multiple UEs; and
refrain from communicating over the wireless channel during the first time period based at least in part on receiving the message.

26. The apparatus of claim 25, wherein the instructions are further executable by the processor to:
receive a preamble during the second time period and using the second RAT, wherein the second time period is prior to the first time period.

27. The apparatus of claim 25, wherein the instructions are further executable by the processor to:
receive the message across a first band of frequencies that overlaps with and is wider than a second band of frequencies used for the data transmission.

28. The apparatus of claim 25, wherein the instructions are further executable by the processor to:
receive multiple messages simultaneously during the second time period using the second RAT across respective first bands of frequencies that overlap with and are collectively wider than a second band of frequencies used for the data transmission.

* * * * *